3,398,641
TRIMMING APPARATUS
Harry A. Breske, Mishawaka, and Thomas W. Hufziger, Warsaw, Ind., assignors to Uniroyal, Inc., a corporation of New Jersey
Filed Aug. 11, 1966, Ser. No. 571,753
8 Claims. (Cl. 90—13)

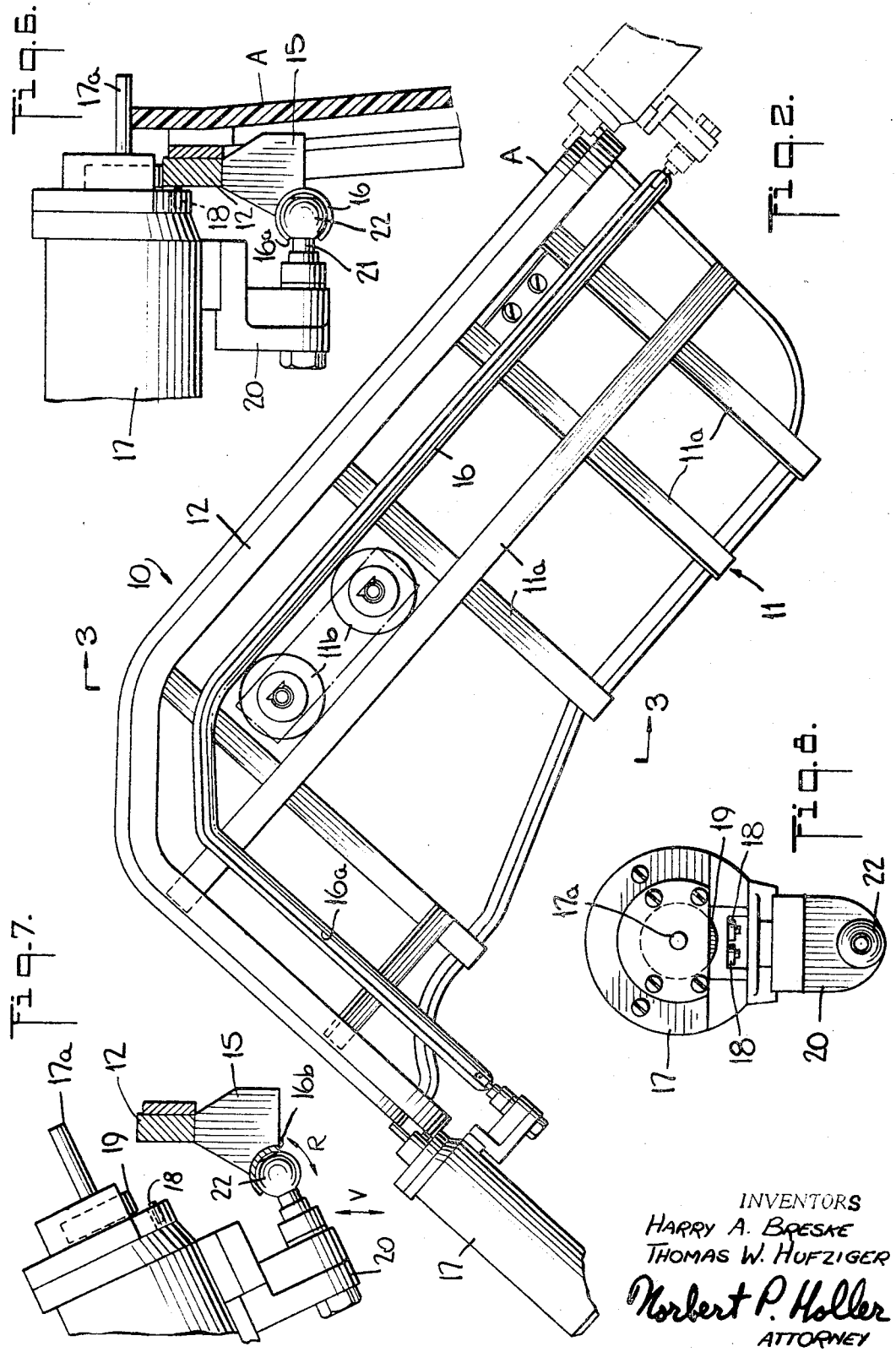

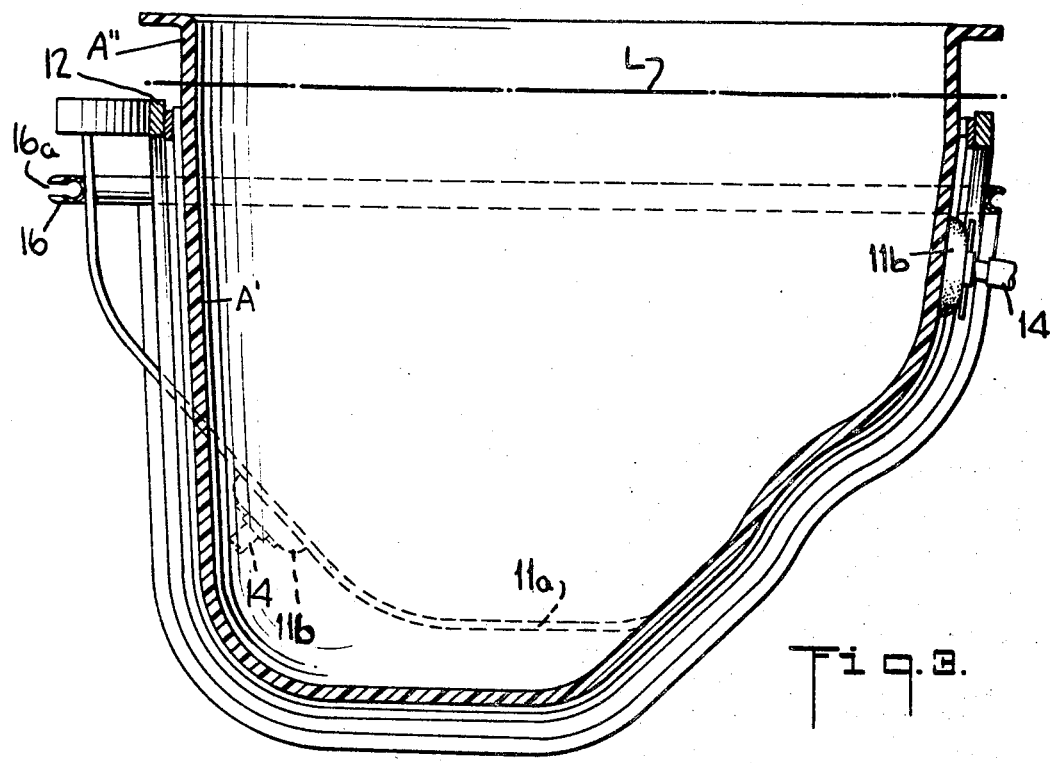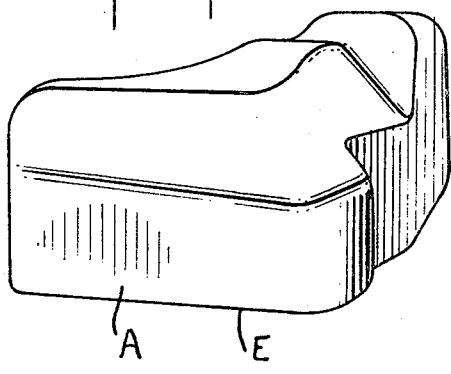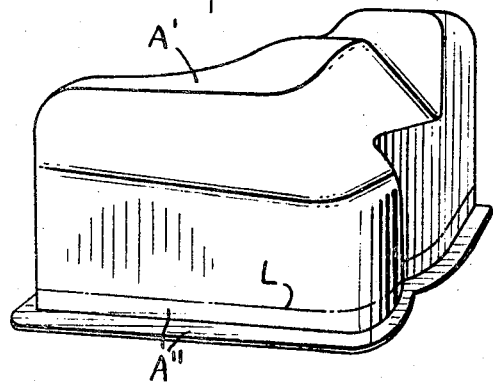
INVENTORS
HARRY A. BRESKE
THOMAS W. HUFZIGER
Norbert P. Holler
ATTORNEY

United States Patent Office 3,398,641
Patented Aug. 27, 1968

This invention relates to apparatus for trimming scrap from the edges of formed thermoplastic articles, and to the means in such apparatus for supporting such articles during an edge trimming operation and for guiding a trimming tool in a predetermined path along such article.

In the manufacture of various structural articles by such methods as vacuum forming, drawing and the like, wherein a sheet of thermoplastic material is shaped into the desired three-dimensional structure by being deformed, usually with the aid of heat, in a suitable hollow mold, it is generally necessary to utilize an oversized sheet in order to provide a marginal gripping area at which the sheet can be held during the forming or shaping operation. This marginal region and possibly also formed sheet portions adjacent to it constitute scrap which must be removed from the finished article. Various techniques for trimming such scrap from the unfinished article are known, generally utilizing manually held and moved air or electrically operated sabre saws, with the article mounted either in a mold or a suitable frame to minimize the vibrations generated during the sawing operation, or even being loosely positioned on a supporting table while the sawing operation is performed, and with the article having a properly contoured trim line placed on its outer surface either during the forming operation or subsequently thereto, for example with the aid of a template. It will be readily apparent that these techniques are of minimum acceptability at best, since even when the operator is highly skilled, the production of articles with rough and irregular edges can hardly be avoided.

It is an object of the present invention, therefore, to provide a novel and improved trimming apparatus which comprises means for securely holding a shaped or formed article of thermoplastic sheet material during a trimming operation and for simultaneously accurately guiding a trimming tool along the marginal region of such article in a path having the contours of the desired edge of the article.

It is another object of the present invention to provide article-holding and trimming tool-guiding means as aforesaid through which the need for manual guidance of the tool by a skilled operator is effectively eliminated and the performance of accurate trimming operations even by relatively unskilled labor is made possible.

Yet another object of the present invention is the provision of such means by which a substantial reduction in the production of inaccurately trimmed shaped or formed articles of thermoplastic sheet material, and consequent substantial manufacturing economies, may be achieved.

The foregoing and other objects, as well as the characteristics and advantages, of the present invention will be more fully understood from the following detailed description thereof when read in conjunction with the accompanying drawings, in which:

FIG. 2 is a front elevational view of the structure shown in FIG. 1, the supporting framework of the apparatus and certain other elements being omitted for the sake of clarity;

FIG. 3 is a sectional view taken along the line 3—3 in FIG. 2;

FIGS. 4 and 5 are perspective illustrations, respectively, of a formed or shaped article as the same appears prior to and subsequent to being trimmed;

FIG. 6 is a fragmentary enlarged vertical section through the trimming tool-guiding portion of the apparatus and illustrates the manner in which the tool sits and rides thereon in greater detail;

FIG. 7 is a fragmentary enlarged sectional view taken along the line 7—7 in FIG. 1 and illustrates the manner in which the tool may be mounted on and removed from the apparatus; and FIG. 8 is a front elevational view of the trimming tool as seen from the right in FIGS. 6 and 7.

Figure 1:
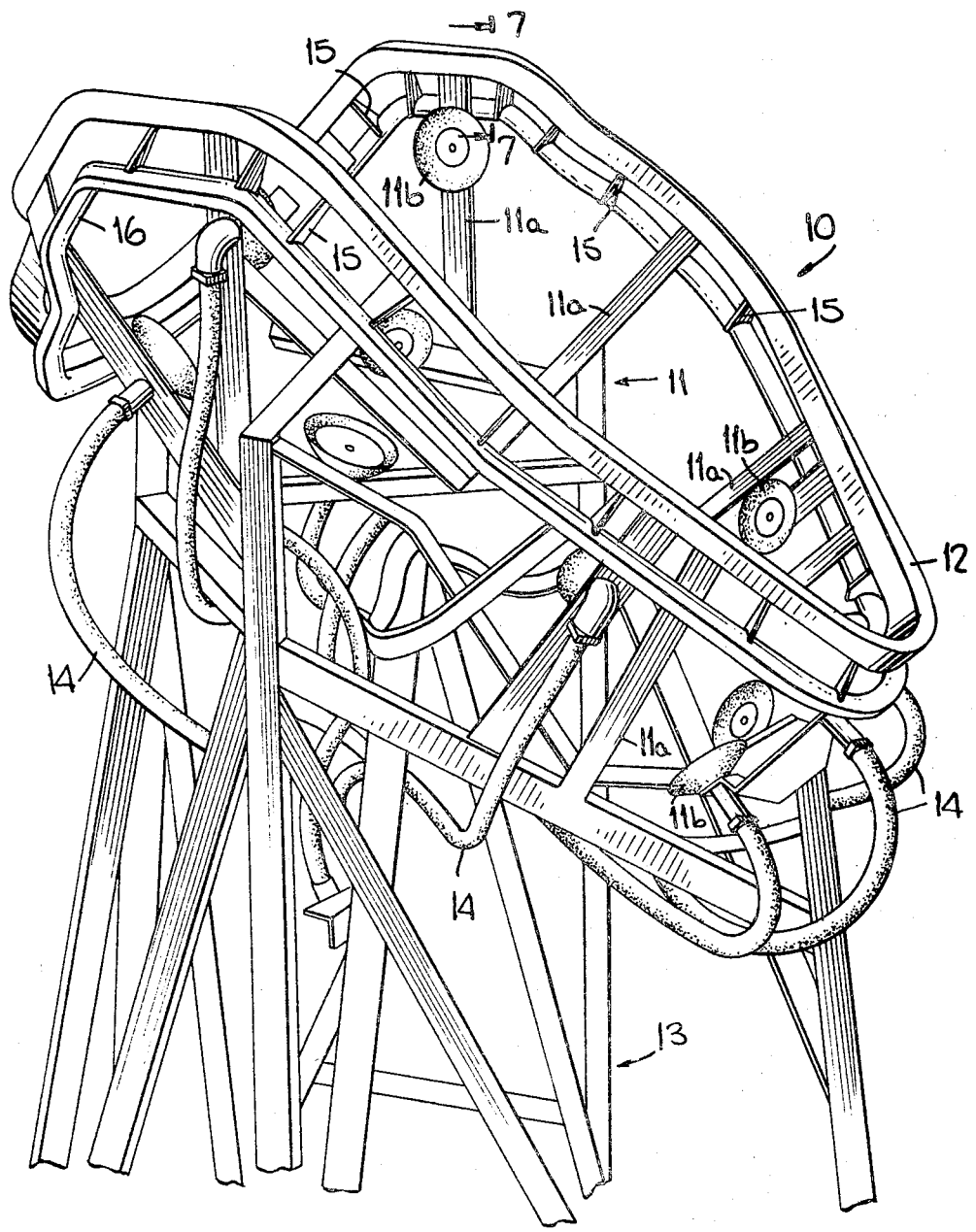
FIG. 1 is a fragmentary perspective illustration of the article-holding and tool-guiding means of a trimming apparatus according to the present invention.

Referring now to the drawings in greater detail, the illustrated trimming apparatus 10 according to the present invention is designed to be utilized, merely by way of example, in the production of a hollow article A (FIG. 5) such as an engine cover of the "bubble" type which is adapted to fit over the exposed engine in the cab of a "cab-over-engine" truck tractor so as to engage tightly against the floor and firewall portions of the cab. The article A is initially shaped or formed, preferably with the aid of a suitable mold, from an oversized sheet of thermoplastic material, e.g. an acrylonitrile-butadiene-styrene (ABS) resin, and in its unfinished state, as shown at A' (FIG. 4), has a marginal region A" which must be trimmed off in such a manner as to impart to the article A a properly contoured edge E (FIG. 5).

To this end, the apparatus 10 comprises an article-receiving cradle 11 (FIGS. 1 to 3) which is peripherally bounded by a rail 12 of essentially rectangular cross section (FIGS. 6 and 7). The cradle is supported on any suitable set of legs or other framework 13 and comprises a plurality of interconnected, appropriately shaped structural members 11a on a number of which are arranged suction cups 11b which are connected by suitable ducts or hoses 14 to a source of vacuum (not shown) through the intermediary of a suitable control valve arrangement (not shown). The inner contours of the cradle 11 as defined by the structural members 11a thereof and the positions of the suction cups 11b are so predetermined that when the unfinished article A' is placed into the cradle in an inverted position, i.e., with its marginal region A" facing upwardly (FIG. 3), its outer surface is engaged by the suction cups 11b. When vacuum is applied to the latter, therefore, the article A' is held securely in position with the marginal region A" projecting upwardly above the rail 12.

Coextensive with the rail 12 and suspended therefrom equidistantly at all points with the aid of a plurality of braces 15 as a tubular rail 16 which is provided over its entire length with a longitudinal slot 16a opening outwardly of the cradle 11. At one short section of the tubular rail 16, the slot 16a is enlarged somewhat, for example as indicated at 16b (FIG. 7), for a purpose which will become clear as the description proceeds. As clearly shown in FIGS. 1 and 2, both rails are identically contoured in a manner corresponding to the intended contours of the edge E of the article A. The rails 12 and 16 together constitute the supporting and guiding structure for a router or like trimming tool 17 having a bit 17a at its front end.

Referring now particularly to FIGS. 6 to 8, at its end facing the cradle 11 the router 17 is provided with a pair of small bearing wheels 18 adapted rollingly to engage the outward peripheral surface of the rail 12, and with a relatively large bearing wheel 19 adapted rollingly to engage the top surface of the rail 12. Depending downwardly from the bottom of the router is an arm 20 which rotatably supports a frontwardly extending rod 21 carrying a substantially spherical ball member 22 at its free end. The dimensions of the ball member 22 are such as to enable it to fit snugly but smoothly slidably into the tubular rail 16, and the thickness of the rod 21 is such as to enable it to extend freely through the slot 16a in the rail 16. Thus, if the bearing wheels 18 and 19 are kept in rolling contact with the respective surfaces of the rail 12 by the operator while the ball member 22 (constituting an additional bearing means) is received within the tubular rail 16, the router 17 can be moved without wobbling along the guide structure 12–16 (as indicated in solid and phantom outline in FIG. 2) whereby with the motor of the router running, the marginal region A" of the unfinished article A' will be smoothly and precisely trimmed off at a specified distance above the rail 12 and along a predetermined contoured path, designated graphically by the dot-dash line L in FIGS. 3 and 4, corresponding to the desired edge E. Quite obviously, since the contours of the rail 12 conform to the intended contours of the edge E of the finished article A, as long as the operator simply takes care to see that the bearing wheels 18 and 19 remain in contact with the rail 12, the possibility of an uneven edge being formed is substantially eliminated.

The router 17 may, of course, be readily removed from the cradle 11 whenever necessary, for example when a finished article A is to be removed from the cradle and replaced by an unfinished article A'. This is clearly illustrated in FIG. 7. When the spherical ball member 22 is in the region of the enlarged slot portion 16b of the rail 16, the router 17 and its appurtenant parts may be rotated as an entity counterclockwise about the longitudinal axis of the rail 16, as indicated by the curved double-headed arrow R, so as to separate the bearing wheels from the rail 12. As soon as the resultant clearance is sufficient, the router can be lowered, as indicated by the straight double-headed arrow V, to withdraw the ball member 22 completely from the rail 16. The procedure for remounting the router on the cradle 11 is precisely the reverse of the foregoing and thus need not be explicitly described.

It is to be understood that the preceding description of a preferred embodiment of the present invention is for purposes of illustration only, and that the structural and operational features and relationships disclosed herein are susceptible to a number of changes and modifications none of which involves a departure from the spirit and scope of the present invention as defined in the hereto appended claims.

Having thus described our invention, what we claim and desire to secure by Letters Patent is:

1. A trimming apparatus, comprising means for securely holding an article to be edge-trimmed, rail means encircling the location of said article when the same is positioned on said holding means, said rail means being contoured in accordance with the desired edge contours of said article, and a trimming tool adapted to be moved along said rail means for trimming said article, said rail means including a first part and a second part, and said trimming tool being equipped with first and second bearing means arranged, respectively, to ride freely along said first part of said rail means and to be slidably confined to said second part of said rail means.

2. Apparatus according to claim 1, said holding means comprising suction cup means engageable with the outer surface of said article.

3. Apparatus according to claim 1, said second part of said rail means being recessed along a small section thereof to permit release of said second bearing means of said trimming tool, thereby to enable the latter to be removed from said rail means.

4. Apparatus according to claim 1, said second bearing means comprising an arm carried by said trimming tool and a ball member carried by said arm, said second part of said rail means comprising a tubular rail provided throughout its entire length with a lateral slot, the inner dimensions of said tubular rail and the width of said slot being such as to smoothly slidably accommodate said ball member and said arm, respectively, and said slot being enlarged at one section of said tubular rail to an extent sufficient to permit said ball member to be inserted into and withdrawn from the interior of said tubular rail.

5. Apparatus according to claim 4, said first bearing means comprising roller means rotatably carried by said trimming tool for rolling contact with said first part of said rail means.

6. Apparatus according to claim 5, said first part of said rail means presenting two contiguous longitudinal flat surfaces perpendicular to each other, and said roller means comprising at least two rollers arranged for rotation about respective axes perpendicular to each other, the peripheries of said rollers being positioned for simultaneous engagement with said flat surfaces, respectively.

7. In a trimming apparatus; cradle means for securely holding an article to be edge-trimmed, rail means encircling the portion of said cradle means corresponding to the location of the edge region of said article when the latter is positioned on said cradle means, said rail means being contoured in accordance with the desired edge contours of said article and including a first part and a second part adapted to be engaged by respective first and second bearing means of a trimming tool when the latter is mounted on said rail means, said second part of said rail means being constructed over the major portion of its length to slidably confine said second bearing means thereto so as to ensure continuous contact between said first part of said rail means and said first bearing means during movement of said trimming tool along said rail means.

8. In a trimming apparatus according to claim 7; said second part of said rail means comprising a tubular rail provided throughout its entire length with a lateral slot, the interior of said tubular rail and said slot being dimensioned to accommodate said second bearing means, and said slot being enlarged at one section of said tubular rail to an extent sufficient to permit said second bearing means to be inserted into and withdrawn from the interior of said tubular rail.

References Cited

UNITED STATES PATENTS

| 2,842,238 | 7/1958 | Shaw et al. | 90—12 |
| 2,917,976 | 12/1959 | Stovall et al. | 90—12 |
| 3,229,099 | 1/1966 | Schwinghamer et al. | 90—13 |

FOREIGN PATENTS

| 691,064 | 5/1953 | Great Britain. |

GERALD A. DOST, *Primary Examiner.*